(12) United States Patent
Wee et al.

(10) Patent No.: US 12,061,141 B2
(45) Date of Patent: Aug. 13, 2024

(54) INSTRUMENT AND METHOD FOR ACCURATE MEASUREMENT OF SURFACE VISCOSITY OF VISCOUS LIQUID

(71) Applicant: Purdue Research Foundation, West Lafayette, IN (US)

(72) Inventors: Hansol Wee, West Lafayette, IN (US); Brayden W. Wagoner, West Lafayette, IN (US); Pritish M. Kamat, West Lafayette, IN (US); Vishrut Garg, West Lafayette, IN (US); Osman A. Basaran, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 179 days.

(21) Appl. No.: 17/345,839

(22) Filed: Jun. 11, 2021

(65) Prior Publication Data
US 2021/0389221 A1 Dec. 16, 2021

Related U.S. Application Data

(60) Provisional application No. 63/038,184, filed on Jun. 12, 2020.

(51) Int. Cl.
*G01N 13/02* (2006.01)

(52) U.S. Cl.
CPC ..... *G01N 13/02* (2013.01); *G01N 2013/0241* (2013.01); *G01N 2013/0275* (2013.01)

(58) Field of Classification Search
None
See application file for complete search history.

(56) References Cited

U.S. PATENT DOCUMENTS 2,957,338 A 10/1960 Kennedy et al.
3,073,151 A 1/1963 Fann
(Continued)

FOREIGN PATENT DOCUMENTS

EP 1950550 A1 * 7/2008 ............. G01N 11/06

OTHER PUBLICATIONS

Bienia, Marguerite, et al. "Inkjet printing of ceramic colloidal suspensions: Filament growth and breakup." Chemical Engineering Science 149 (2016): 1-13. (Year: 2016).*

(Continued)

*Primary Examiner* — Matthew G Marini
(74) *Attorney, Agent, or Firm* — Maginot, Moore & Beck LLP

(57) ABSTRACT

A method is provided for determining the surface viscosity of a liquid in which a thread is formed from a drop of the liquid. The thread is lengthened and its minimum radius $h_0$ is determined at multiple times between the thread formation and thread pinch-off. The minimum radius and associated time values are used to determine a linear relationship of minimum radius and time, with the coefficient of the linear relationship, or the slope X of the line in the linear relationship, corresponding to the surface viscosity $\mu_s$ of the liquid according to one of the following equations:

$$x = \frac{0.0709}{1 + 5B_{s0/3h_0}}, \qquad (1)$$

where $B_{s0} = \mu_s/\mu R$ in which $h_0$ is defined as above, R is the dimension of the feature on which the drop is provided and $\mu$ is the bulk viscosity of the liquid, or $$x = \frac{0.0304}{Oh(1 + 5b_{s0/3h_0})}, \qquad (2)$$

(Continued)

in which $Oh=\mu/\sqrt{\rho R \sigma}$, where $\mu$ and $R$ are as defined above, $\rho$ is the density of the liquid, and $\sigma$ is the surface tension of the liquid without surfactants.

20 Claims, 10 Drawing Sheets

(56) References Cited

U.S. PATENT DOCUMENTS

| | | | |
|---|---|---|---|
| 3,227,916 | A | 1/1966 | Proskauer |
| 3,677,070 | A | 7/1972 | Norcross |
| 4,627,272 | A | 12/1986 | Wright |
| 4,864,849 | A | 9/1989 | Wright |
| 5,025,656 | A | 6/1991 | Wright |
| 6,584,831 | B1 | 7/2003 | Kasameyer et al. |
| 2017/0228882 | A1* | 8/2017 | Dillingham ............ G01N 13/02 |

OTHER PUBLICATIONS

R. Leonard, R. Lemlich, AIChE J. 11 (1965) 18.
P.A. Harvey, A.V. Nguyen, G.J. Jameson, G.M. Evans, Miner. Eng. 18 (2005) 311.
A.V. Nguyen, J. Colloid Interface Sci. 249 (2002) 194.
D.A. Edwards, H. Brenner, D.T. Wasan, Interfacial Transport Processes and Rheology, Butterworth-Heinemann, Boston, 1991.
C. Barentin, C. Ybert, J.-M. di Meglio, J.-F. Joanny, J. Fluid Mech. 397 (1999) 331.
J.T. Petkov, K.D. Danov, N.D. Denkov, R. Aust, F. Durst, Langmuir 12 (1996) 2650.
A.M. Poskanzer, F.C. Goodrich, J. Phys. Chem. 79 (1975) 2122.
Patist, T. Axelberd, D.O. Shah, J. Colloid Interface Sci. 208 (1998) 259.
D.O. Shah, N.F. Djabbarah, D.T. Wasan, Colloid Polym. Sci. 256 (1978) 1002.
S.A. Koehler, S. Hilgenfeldt, E.R. Weeks, H.A. Stone, Phys. Rev. Lett. E 66 (2002) 040601.
O. Pitois, C. Fritz, M. Vignes-Adler, J. Colloid Interface Sci. 282 (2005) 458.
Saint-Jalmes, Y. Zhang, D. Langevin, Eur. Phys. J. E 15 (2004) 53.
M. Durand, D. Langevin, Eur. Phys. J. E 7 (2002) 35.
P. Stevenson, C. Stevanov, Ind. Eng. Chem. Res. 43 (2004) 6187.
K. Wantke, K. Malysa, K. Lunkenheimer, Colloids Surf. A 82 (1994) 183.
H. Fruhner, K.-D. Wantke, K. Lunkenheimer, Colloids Surf. A 162 (1999) 193.
Stevenson, Paul. "Remarks on the shear viscosity of surfaces stabilised with soluble surfactants." Journal of colloid and interface science 290.2 (2005): 603-606.

* cited by examiner

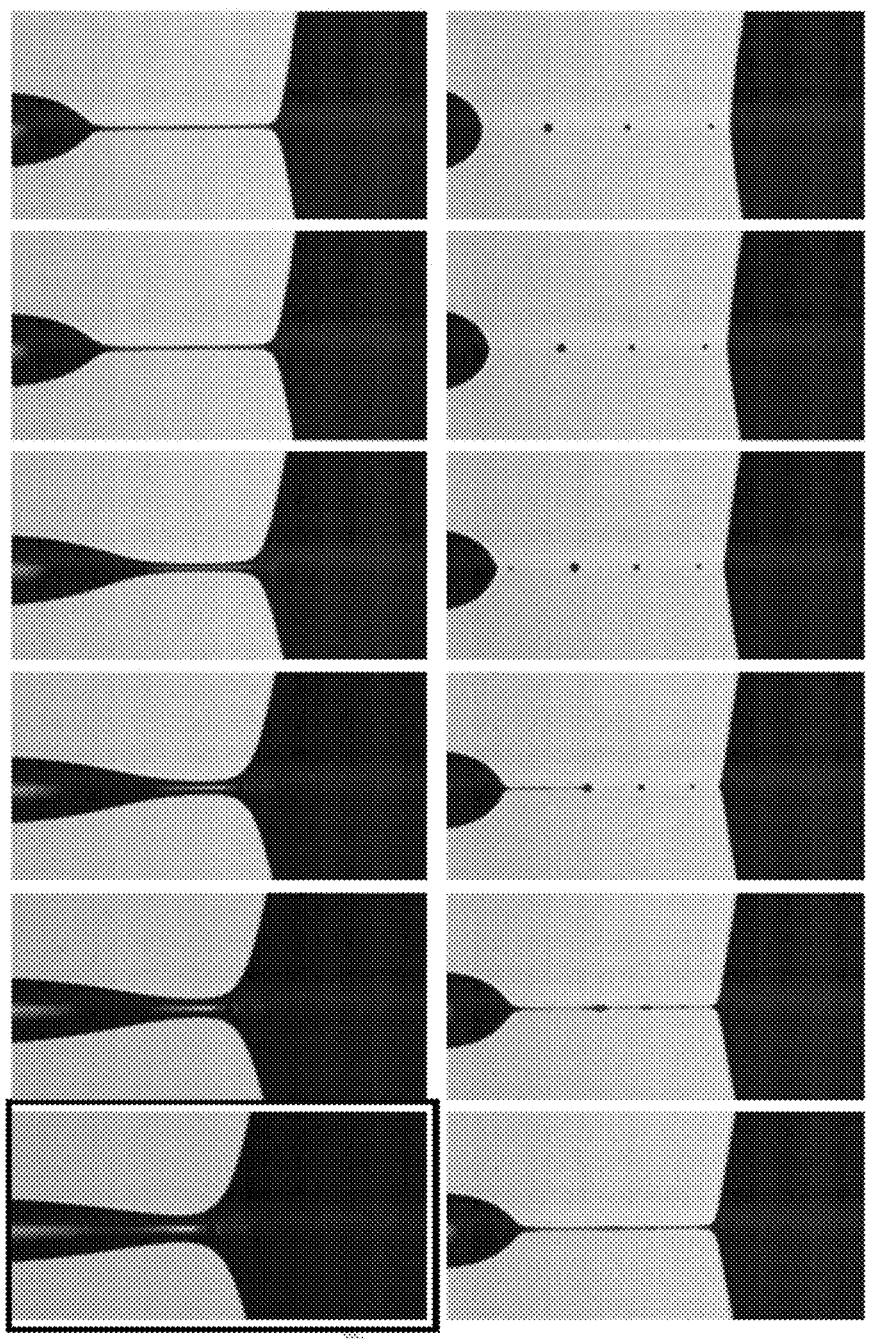
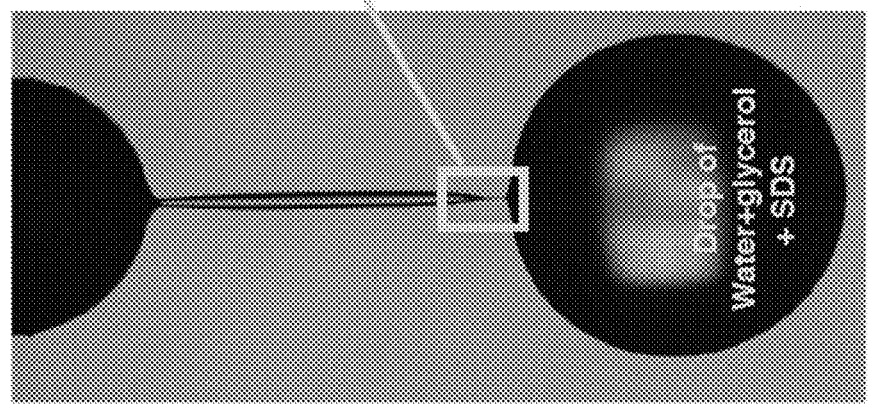
FIG. 3

INSTRUMENT AND METHOD FOR ACCURATE MEASUREMENT OF SURFACE VISCOSITY OF VISCOUS LIQUID

CROSS REFERENCE TO RELATED APPLICATION

This application claims priority to U.S. Provisional No. 63/038,184, filed on Jun. 12, 2020, and entitled "Method for Measuring Surface Viscosity", the entire disclosure of which is incorporated herein by reference.

BACKGROUND

A wide variety of processes involve the expulsion of liquid drops from nozzles, ranging from crop spraying to additive manufacturing to inkjet printing. These processes rely on the break-up and coalescence of drops to perform the desired operation, whether it is for controlled dissemination of liquid herbicides, for controlled distribution of liquid metal or plastic in an additive manufacturing process, or for controlled distribution of ink onto a substrate. In these processes, control of drop size and distribution is critical. Moreover, elimination of undesirable and unwanted satellite droplets is important to the integrity of manufacturing and printing processes.

Surfactants are routinely used in diverse applications involving interfacial or free-surface flows. Well-known examples of such applications include: (a) coating flows; (b) flow through porous media as in enhanced oil recovery where they are used to help mobilize or displace oil that is trapped in the pores of crude-oil-containing rock formations; (c) treatment of respiratory distress syndrome where surfactants are injected into the lungs to enable inflation of alveoli and prevent them from collapsing; (d) crop spraying where surfactants facilitate spreading of agricultural chemicals on the leaves of plants but also affect in a complex way the sizes and distributions of sizes of spray drops which may lead to increased spray drift or pollution; and (e) during drop formation in myriad applications including ink jet printing. Certain example applications and the importance of drop and thread dynamics on those applications are described in Appendix A to this application, which disclosure is incorporated herein by reference.

As also described in Appendix A, a liquid drop forms a thread from the outlet nozzle to the drop, which thread thins as the drop moves farther away from the nozzle. The thread continues to thin until it pinches-off, at which point the drop is free. However, unless the drop formation is controlled, unwanted satellite droplets can form from the thread, as shown in the exemplary diagrams of FIG. 1. As depicted in the exemplary diagrams of FIGS. 2-3, the addition of a surfactant to the liquid alters the formation of the drop and the thread, and alters the pinch-off or break up of that thread, often increasing the formation of satellite droplets.

The primary purpose for adding a surfactant to liquids is attributable to their preferential adsorption onto interfaces and the concomitant lowering of surface tension, and hence capillary, pressure, by their presence at interfaces. However, surfactant concentration is often non-uniform at an interface in a free-surface flow because of interfacial area change by compression or expansion due to normal dilatation and tangential stretching, and surfactant transport by convection and diffusion. Gradients in surfactant concentration give rise to gradients in surface tension and hence tangential interfacial—i.e., Marangoni—stresses. In addition to the lowering of surface tension—the soluto-capillary effect—and the Marangoni effect, surfactants may also induce surface rheological effects as surfactant molecules are transported along an interface and give rise to frictional losses as the molecules deform against one another.

The applications described above rely on drop formation and on interface pinch-off or break-up of drops as they are ejected or dispersed. The understanding of the role of the soluto-capillary and Marangoni effects on the breakup of jets of Newtonian fluids is fairly complete, but by comparison the understanding of the role of surface viscosities on pinch-off is very incomplete. The reason for the disparity in the understanding of jet breakup with and without surface theological effects is due in part to the difficulty in measuring the rheological properties of interfaces in comparison to surface tension. In the absence of surfactants or for clean interfaces, surface tension is a material property that simply depends on the thermodynamic state of the liquid. In the presence of surfactants, surface tension is lower than that when the interface is clean and is reduced by an amount that depends on the local surfactant concentration.

Drop coalescence and coating flow also play significant roles in many processes. Coalescence is an important feature in any process involving emulsions, such as the production of food products, like milk and mayonnaise, and the production of certain drugs. Coating flow is of particular concern in the processes involving thin film coatings, such as the production of adhesive tape. Surface viscosity directly affects coalescence and coating flow, although until now there has been no method for accurately determining surface viscosity.

Numerous robust methods exist for accurately measuring the surface tension of clean as well as surfactant-laden interfaces. In contrast, to measuring surface tension, measurement of material properties of interfaces has proven elusive. With respect to the measurement of surface shear viscosity, researchers have reported values that differ by orders of magnitude. One possible reason for the discrepancies in measurements may be drat many methods generate a mixed interfacial flow, with both shear and dilatational components, and the surface shear and dilatational viscosities cannot be unambiguously determined from measurements of a single mixed-type flow. Another complication comes from the fact that the flows induced in different experiments often give rise to surface tension gradients and it is then virtually impossible to separate the contributions of the resulting Marangoni stresses from those due to surface viscosities.

Currently, computational fluid dynamics and other computational tools are used to model how drops are formed, jetted and/or dispersed as part of many processes. These models are then used to generate operational parameters for efficient and effective implementation of the processes. At present, the primary inputs to these computational tools are bulk viscosity and surface tension of the liquid along with physical characteristics of the process equipment. Even though surface viscosity affects the rheology of the liquids during these processes, that variable is not used in the modeling because it cannot be reliably measured. Adding an accurate measure of surface viscosity to the other fluid properties considered in the computational modeling will improve the accuracy of those models and will ultimately improve the processes using those liquids.

The dynamics of drop formation and expulsion are based on certain physical properties of the liquid, namely bulk viscosity, equilibrium and dynamic surface tension and surface viscosity. Accurate measurement of bulk viscosity and surface tensions is available with current technology.

However, no technology exists that is capable of accurately measuring surface viscosity. Accurate measurement of surface viscosity is even more important when a surfactant is used. The inability to accurately and consistently measure surface viscosities means that any determination of liquid drop and jetting characteristics, as well as the effect of pinch-off or coalescence of drops, is incomplete. This, in turn, means that the determination of parameters for drop ejection and distribution is inherently just an estimate. There is a significant need for accurate measurement of surface viscosity of liquids for use in determining parameters for drop ejection and distribution in a variety of applications.

SUMMARY OF THE DISCLOSURE

A method is provided for determining the surface viscosity of a liquid using a drop of the liquid and a thread formed from the drop. The length of the thread is increased over time and the minimum radius of the thread is ascertained at multiple intervals. A linear relationship between the minimum radius and time is determined, and the slope X of the line in that linear relationship is obtained. The slope X is then used to calculate the surface viscosity $\mu_s$ of the liquid according to one of the following equations:

$$x = \frac{0.0709}{1 + 5B_{s0/3h_0}}, \quad (1)$$

where $B_{s0} = \mu_s/\mu R$ in which $h_0$ is the initial minimum radius of the thread, R is the dimension of the feature on which the drop is provided and $\mu$ is the bulk viscosity of the liquid, or $$x = \frac{0.0304}{Oh(1 + 5B_{s0/3h_0})}, \quad (2)$$

in which $Oh = \mu/\sqrt{\rho R \sigma}$, where $\mu$ and R are as defined above, $\rho$ is the density of the liquid, and $\sigma$ is the surface tension of the liquid without surfactants In one aspect, equation (1) is selected when the Reynolds number for the liquid is small, and equation (2) is selected when the Reynolds number for the liquid is large. In accordance with the present disclosure, a Reynolds number of 1 or less is considered small.

In a further feature of the method, the radius of the thread is determined from photographic images acquired at time intervals between the formation of the thread and the pinch-off of the thread (when the radius is zero). The images are digitized and edge detection can be used to determine the edges of the thread along its length. The location of the minimum radius is determined and the minimum radius is measured. In one embodiment, the measurement is based on the number of pixels between the detected edges at the location of the minimum radius.

The method can be used in conjunction with any technique for forming threads from a drop of liquid. In one embodiment, the drop and thread are formed from a liquid nozzle. In another embodiment, the drop is positioned between the ends of two rods and the thread is formed as the rods are moved apart.

DESCRIPTION OF THE DRAWINGS

The above and other objects, features and advantages of various embodiments of the present disclosure will become more apparent when taken in conjunction with the following description and drawings, wherein identical reference numerals have been used, where appropriate, to designate identical features that are common to the figures, and wherein:

FIG. 3 are images of the growth of a thread until pinch-off and the formation of satellite droplets thereafter.

DETAILED DESCRIPTION

Figure 1:
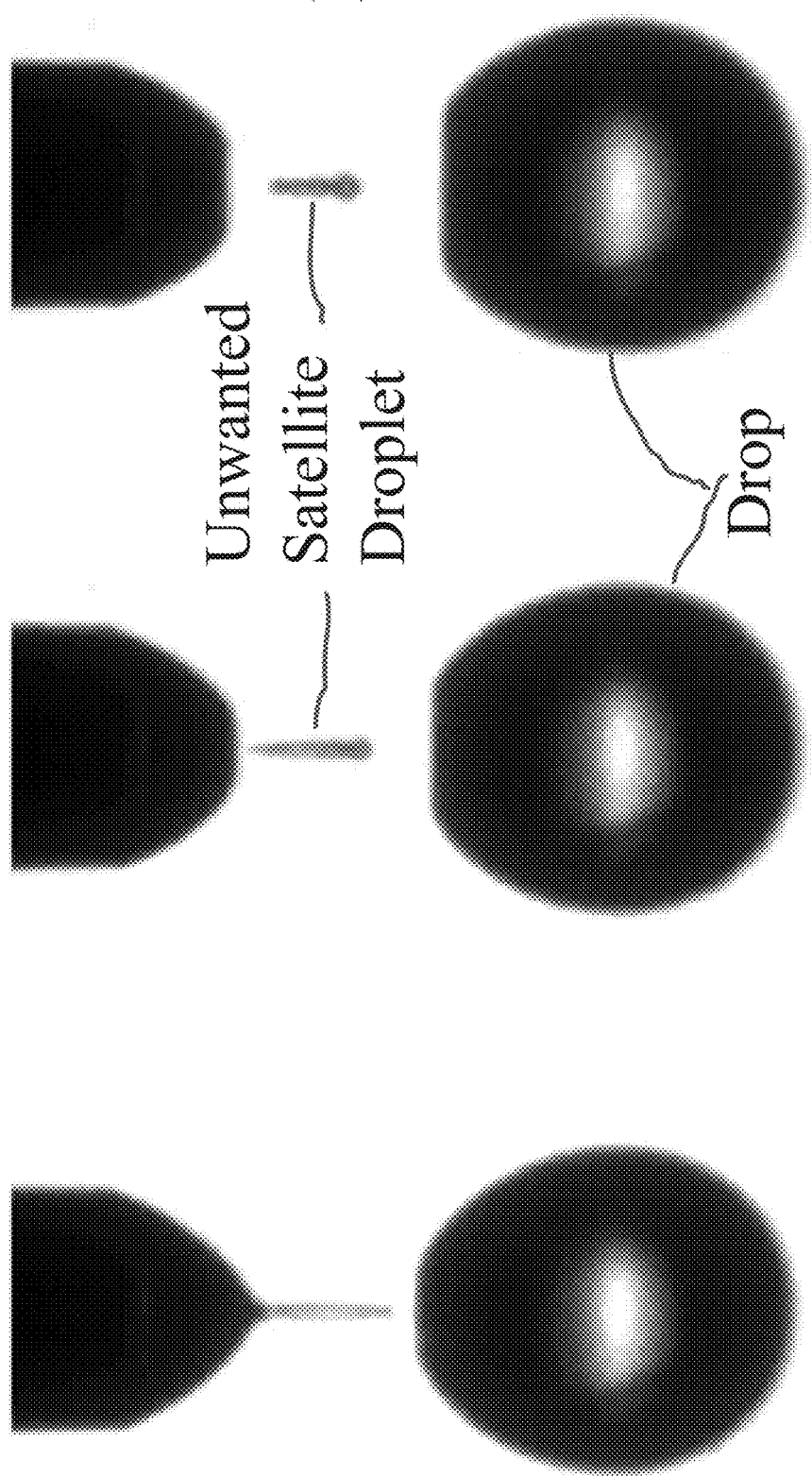
FIG. 1 are enlarged images of a thread after pinch-off showing the formation of unwanted satellite droplets.
Figure 2:
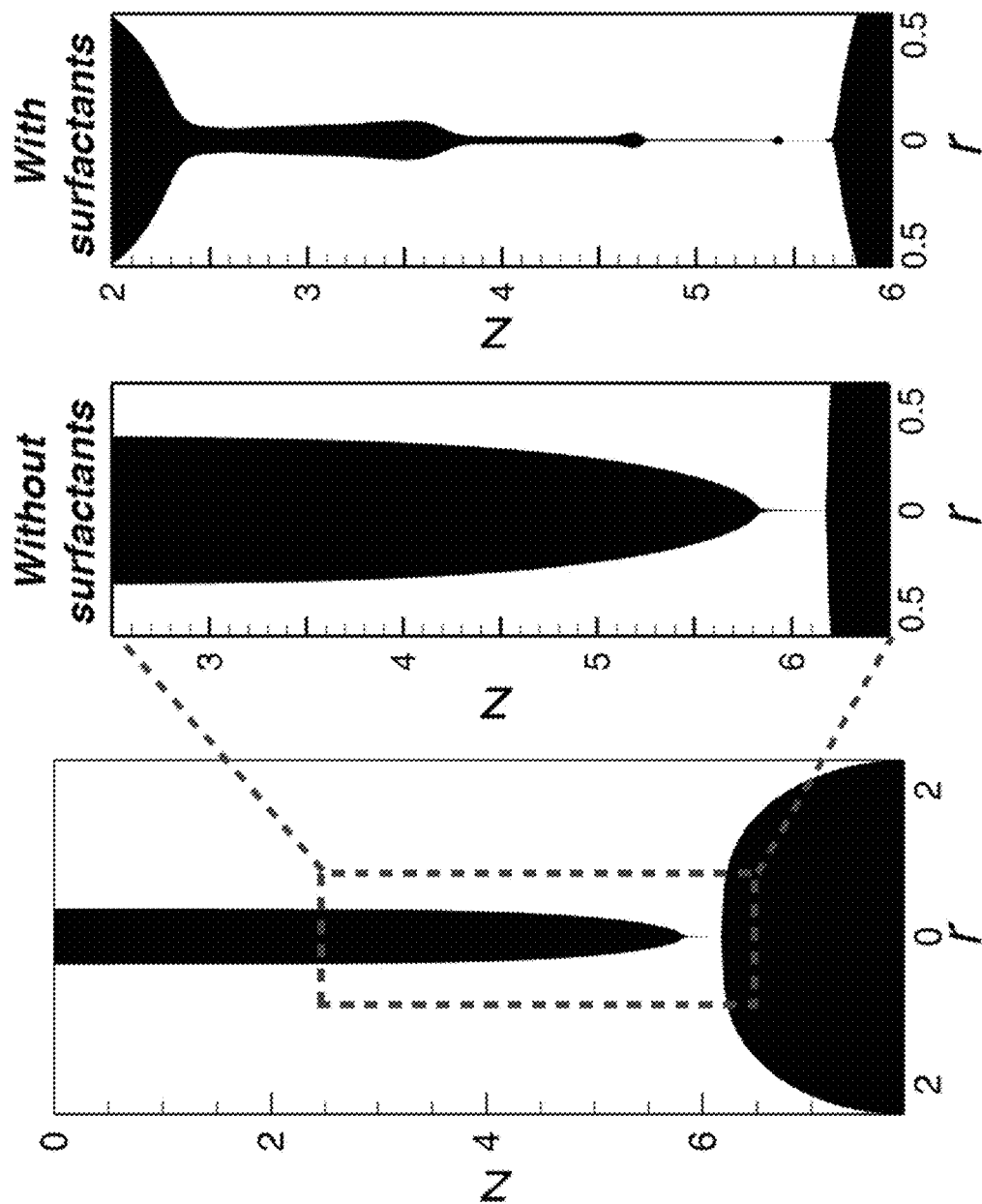
FIG. 2 are diagrams comparing the effect of surfactants on drop and thread formation of a liquid.
Figure 4:
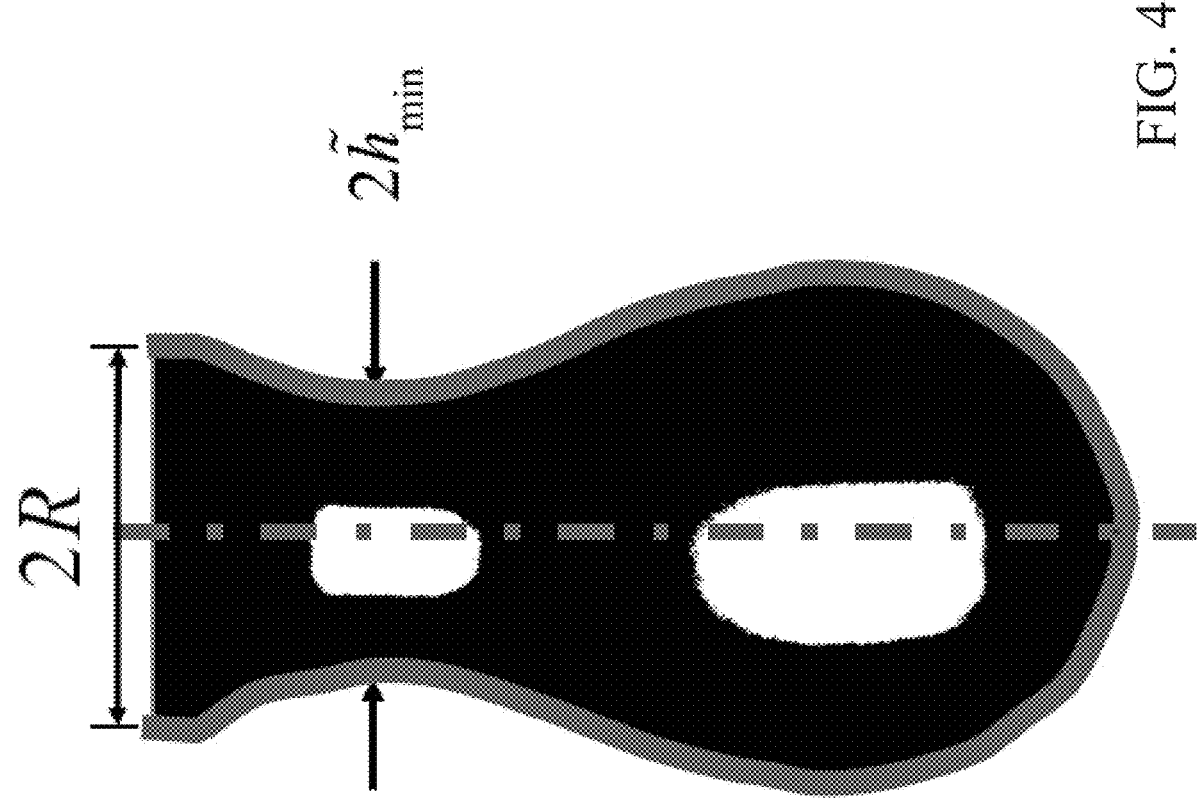
FIG. 4 is a diagram of a drop and the initial formation of a thread of a liquid.
Figure 5:
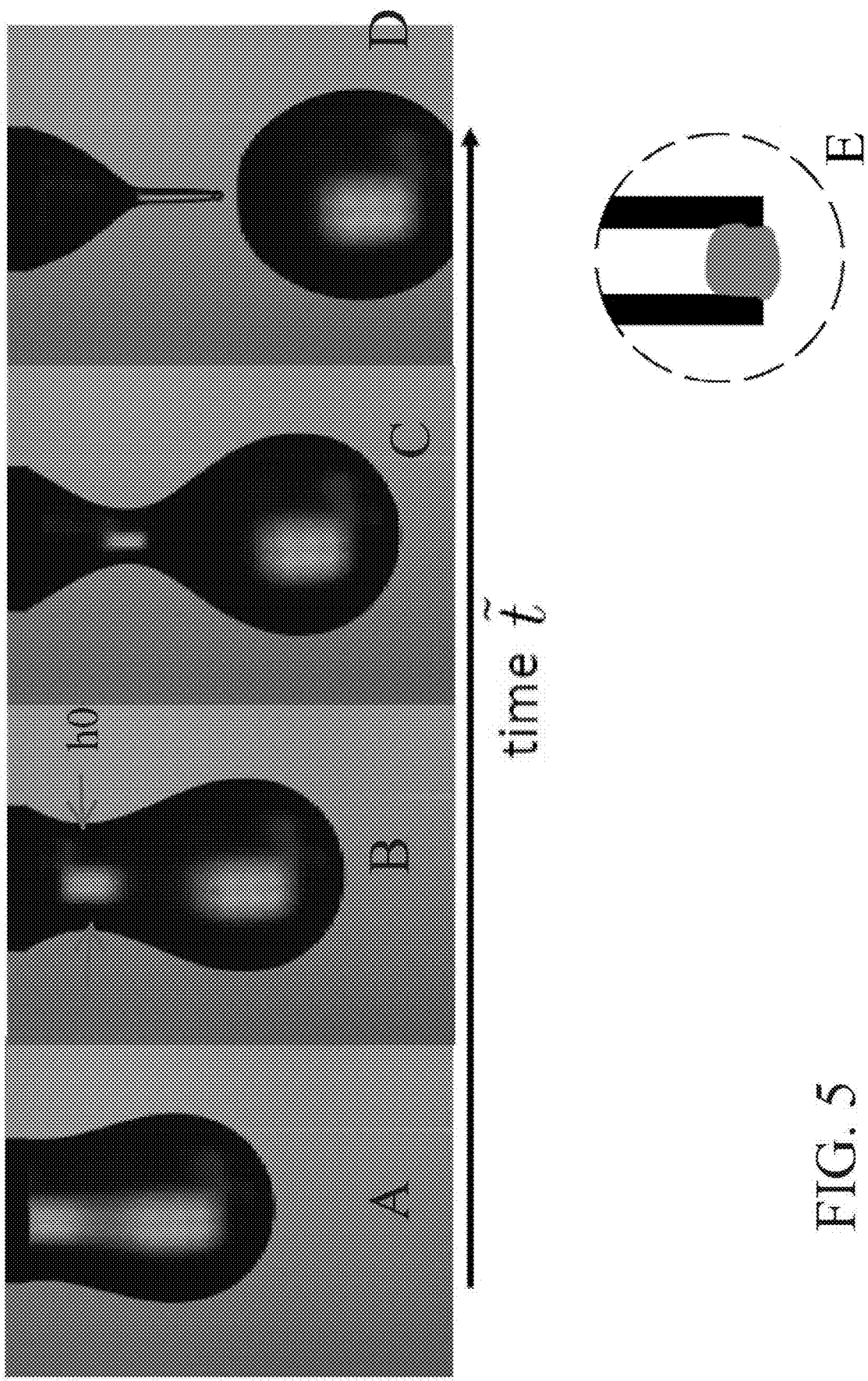
FIG. 5 shows the formation of a drop and thread of a liquid.

The present disclosure contemplates a system and method for accurately measuring surface viscosity of a liquid during drop and thread formation, whether or not the liquid includes a surfactant. The method for measuring surface viscosity is based on a discovery by the present inventors that the surface viscosity is related to the change in thread radius over time. As shown in FIG. 4, a drop starts from liquid exiting the nozzle at a nozzle radius R. As the thread forms it assumes a minimum radius, $h_{min}$, at the drop-thread interface. Over time, as the drop begins to fall under the force of gravity, the minimum radius of the thread decreases, as depicted in FIGS. 5a-d, until the minimum radius is zero—the point at which the thread pinches-off from the drop. In particular, it was discovered that the surface viscosity of the liquid is related to the slope of the change in the minimum thread radius $h_{min}$ from the initial formation of the thread to the pinch-off point. With respect to FIG. 5, the change in minimum thread radius is measured from a time at the formation of the thread when the thread is at an initial minimum thread radius $h_0$ depicted in FIG. 5b, and the time at which the drop separates from the thread, as depicted in FIG. 5d.

It can be appreciated that the approach shown in illustrations A-D of FIG. 5 is only one technique to thread formation. In another technique, a liquid drop is positioned between the end of two rods having the radius R, as shown in illustration E of FIG. 5. The thread is formed as the rods are moved apart. Other techniques for forming a liquid drop and thread are contemplated, with the understanding that the dimension of the feature on which the drop is formed has the radius R.

More specifically, it has been discovered that the change in minimum thread radius, for a low Reynolds number liquid with a surfactant, is given by the equation:

$$h_{min} = \frac{0.0709}{1 + 5B_{s0/3h_0}} \tau, \quad (1)$$

where $B_{s0}=\mu_s/\mu R$ in which $\mu_s$ is the surface viscosity for the liquid at the time of thread formation, $\mu$ is the bulk viscosity of the liquid and R is the dimension of the feature on which the drop is formed, such as the nozzle radius.

For a liquid with a surfactant having a large Reynolds number the equation becomes:

$$h_{min} = \frac{0.0304}{Oh(1+5B_{s0/3h_0})}\tau. \quad (2)$$

In Equation (2), Oh is the Ohnesorge number, or the inverse of the Reynolds number, which is given by the equation $Oh=\mu/\sqrt{\rho R\sigma}$, where $\mu$ and R are defined above, $\rho$ is the density, and $\sigma$ is the surface tension of the liquid without surfactants. Equation 2 is preferably used when the Reynolds number for the liquid is greater than 1.

Figure 6:
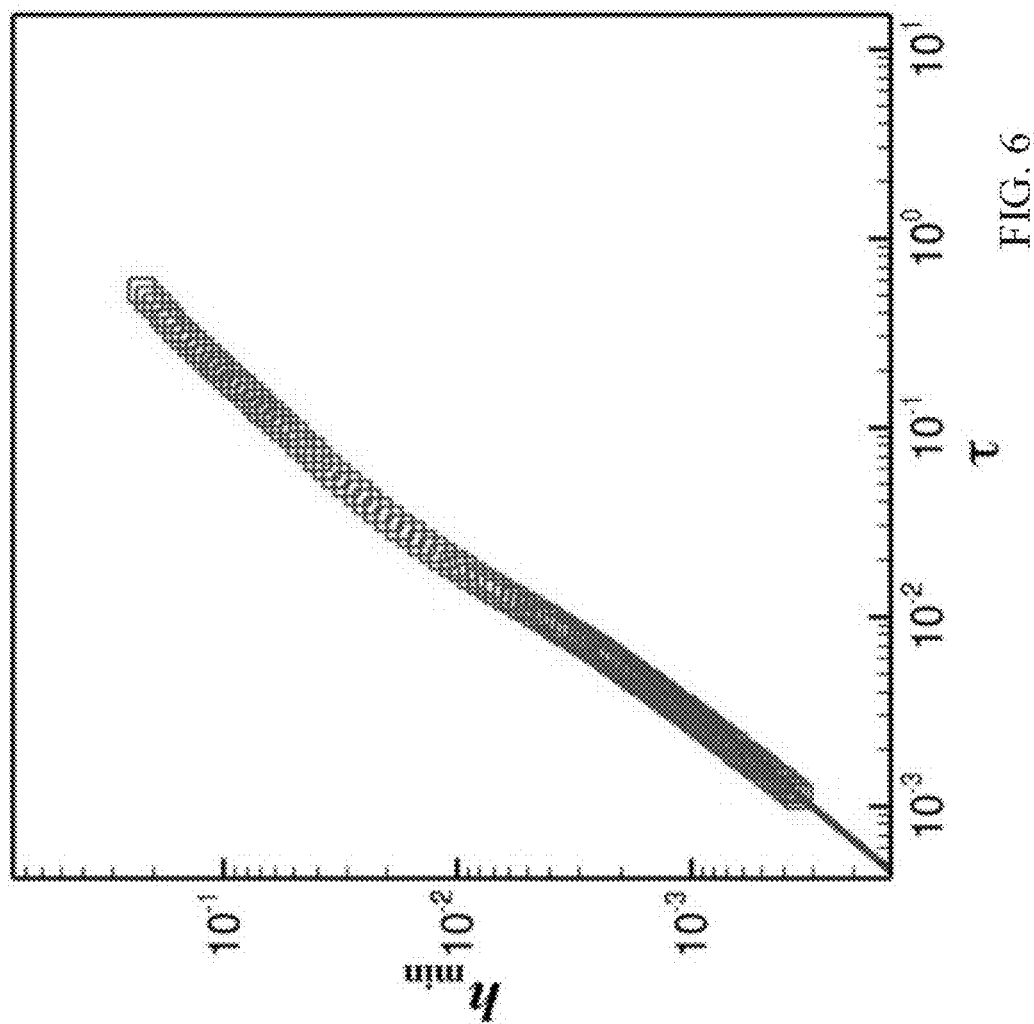
FIG. 6 is a graph of the minimum thread radius of a liquid thread as a function of time.

The development of these equations is described in detail in Appendices B and C, respectively, which disclosures are expressly incorporated herein by reference. As can be appreciated from the form of the two equations, the coefficient of $\tau$ is the slope X of the change in $h_{min}$ as a function of time $\tau$, as reflected in the graph of FIG. 6. (In the graph, the time $\tau$ is measured "backwards" from the time when the thread is pinched off to the time when the thread starts to form.) If the slope is known, it is a matter of simple arithmetic to calculate the unknown constant $B_{s0}$ from which the surface viscosity $\mu_s$ for the liquid can be calculated.

The present disclosure contemplates a measurement system that can determine the slope X, or the coefficient, of Equations (1) and (2). In one embodiment, the measurement system 10, shown in FIG. 7, includes a nozzle 11 for producing a drop of a liquid and a digital camera 12 that captures images of the drop and thread formation, as shown in FIG. 5. In one configuration, the nozzle is supplied with the liquid from a source, such as a syringe pump 13, that can be operated in a controlled manner to provide the liquid to the nozzle at a desired pressure and flow rate to produce a single drop and following thread. It can be appreciated that other means for forming the drop and thread can be employed, provided the drop and thread can be visualized by the camera 12.

The camera acquires an image of the drop as it falls and extends the length of the thread at multiple times $\tau$. A light source 14 can be provided to illuminate or back-light the drop as it falls and as the thread elongates, thins and eventually breaks. The camera continues to acquire images until the thread pinches off—i.e., until the radius of the thread reaches zero.

The multiple images acquired by the camera are provided to an image processor implemented within a computer 15. In one embodiment, the camera can be configured to obtain discrete images at fixed time intervals. In an alternative embodiment, the camera can be a movie camera and the image processor can be configured to capture discrete images at the fixed time intervals. In either embodiment, the image processor is provided with multiple discrete images of the drop and, more importantly the thread, from the creation of the thread to the pinch off of the thread. The multiple images can be digital or subsequently digitized using well-known digitization methods or software. The image processor is configured to determine the nozzle diameter, 2R, the initial minimum width or diameter of the thread, $2h_0$, and the minimum width or diameter of the thread, $2h_{min}$, at each time interval from the digitized images. The image processor can incorporate edge detection methods or software, as is well-known in the art, to determine the edges of the drop and especially the thread. The processor can then determine the pixel width between the detected edges along the vertical length of the drop and thread. The smallest pixel width along the vertical length is identified and that pixel width and the particular time interval is stored for further processing. This process is repeated over several time intervals, with the object being to accumulate ($h_{min}$, $\tau$) pairs sufficient to accurately establish the relationship between the minimum thread radius and time. As reflected in the graph of FIG. 6 that relationship is substantially linear. It can be appreciated that the accuracy of the relationship is a function of the number of ($h_{min}$, $\tau$) data pairs that are used to generate the line shown in FIG. 6. In one embodiment, 100 images are acquired from the creation of the thread to its break-up.

The computer 15 can process the stored $h_{min}$ vs. $\tau$ data to determine the slope X of the line. As needed, the computer can be configured to linearize the stored data, using best-fit or curve-fitting software as is known in the art, to extrapolate the line shown in the graph of FIG. 6, from which the slope X can then be determined. The computer is then configured to calculate the value for $B_{s0}$ according to the equations (1) and (2), and then calculate the surface viscosity $\mu_s$ of the liquid.

Figure 7:
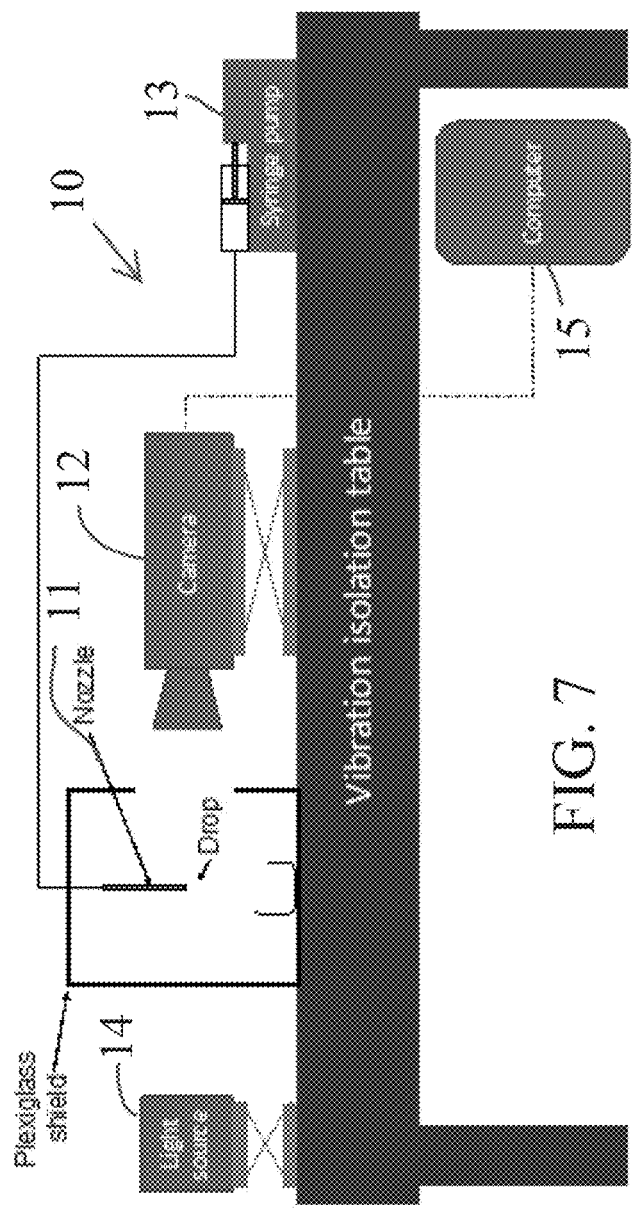
FIG. 7 is schematic of a system for determining the surface viscosity of a liquid according to one embodiment of the disclosure.
Figure 8A:
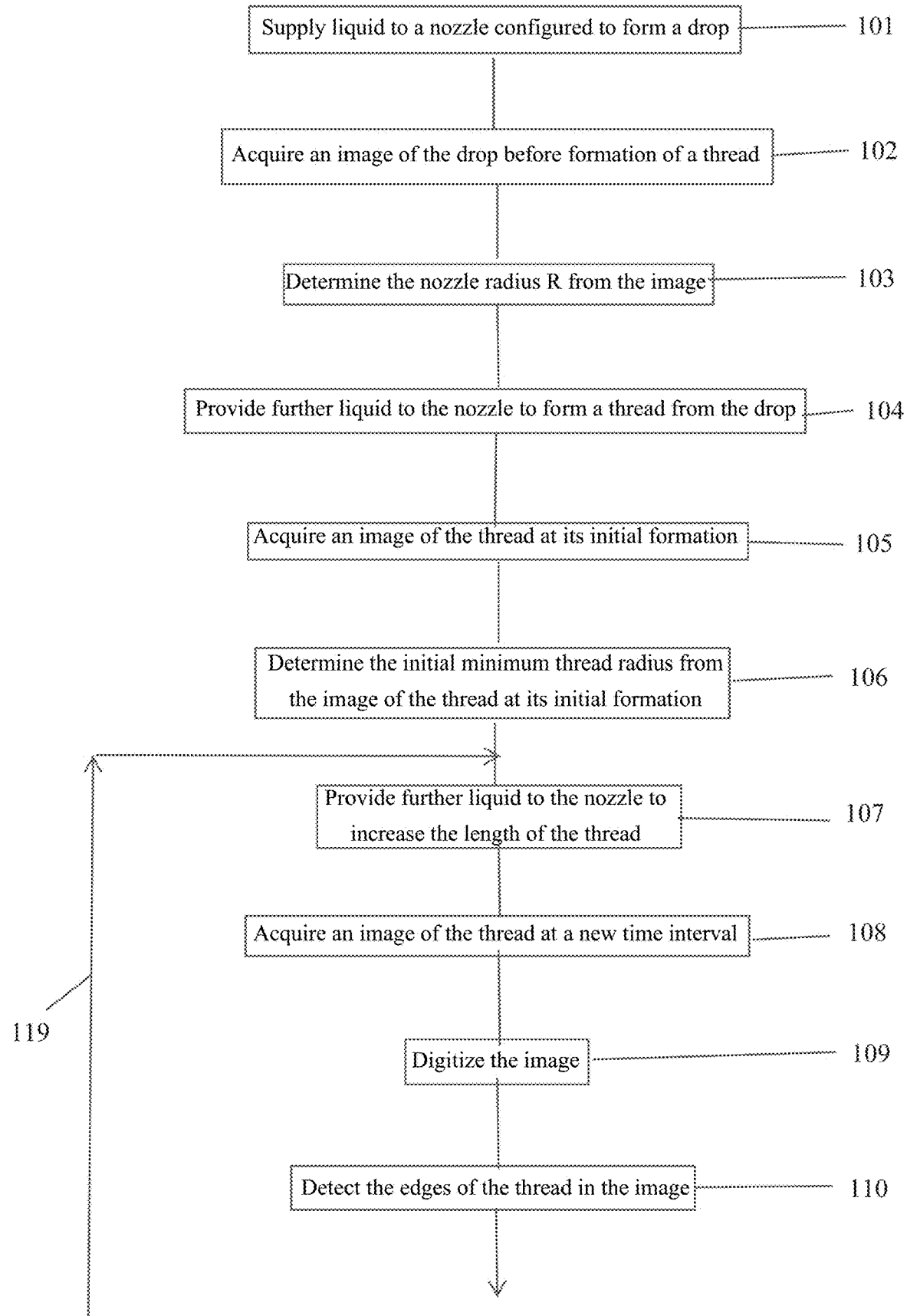
FIGS. 8A-8B form a flow chart of steps of a method for determining the surface viscosity of a liquid.
Figure 8B:
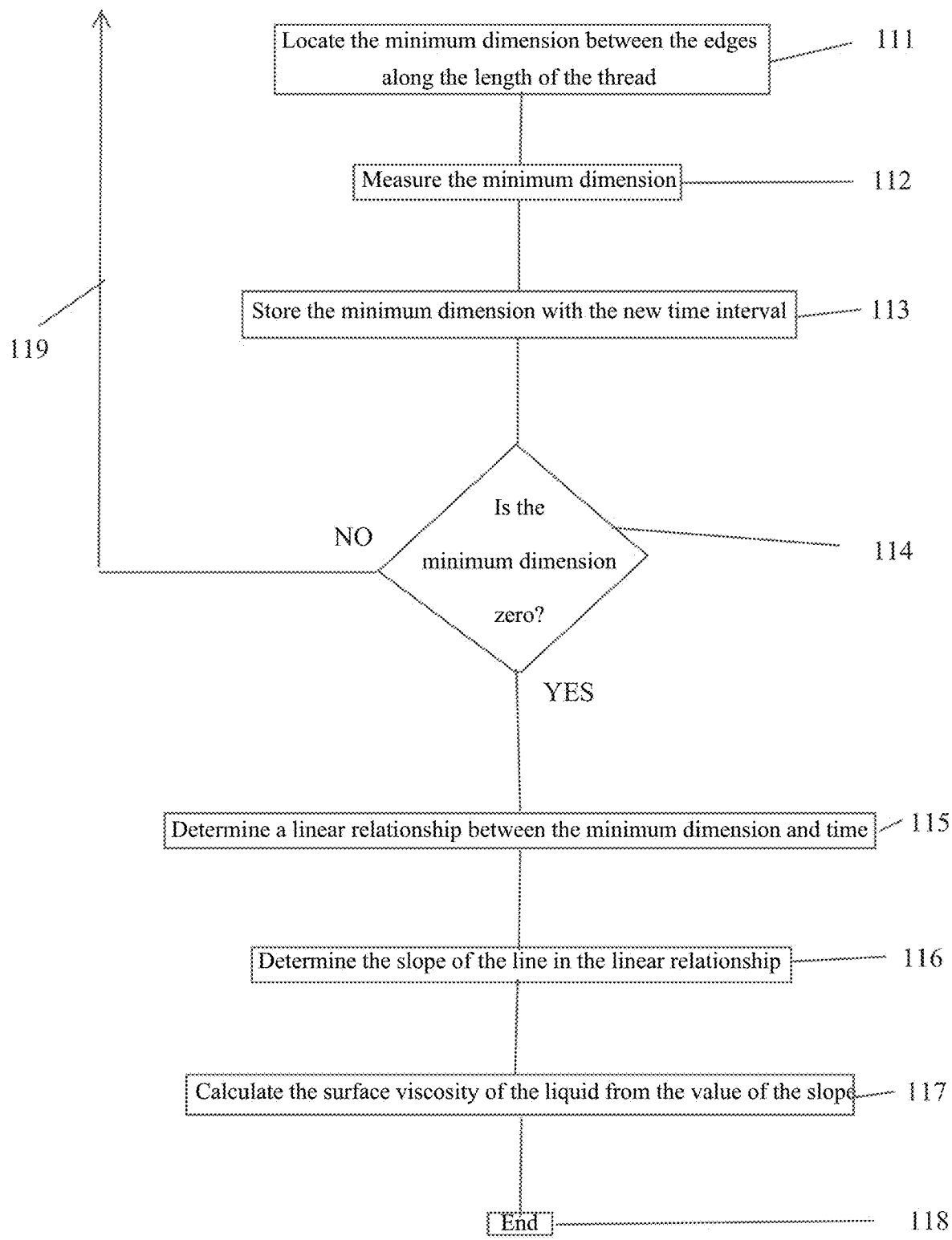

The system 10 shown in FIG. 7 is configured to obtain measurements for the surface viscosity of a liquid according to the method steps in FIG. 8. In the first Step 101, liquid is supplied from the source 13 to the nozzle 11 at a pressure and flow rate sufficient to form a single drop at the nozzle. Once the drop is formed, the camera 12 is operated to obtain an image of the drop in Step 102. In certain embodiments, that image is used to determine the nozzle radius in Step 103, unless the nozzle radius is known a priori. The nozzle radius R can be determined in the same manner that the minimum thread radius is determined in subsequent steps 109-112. The nozzle radius R is stored in a memory for use in calculating the surface viscosity of the liquid.

Further liquid is provided to the nozzle in Step 104 so that a thread will form between the nozzle and the drop. An image is acquired of the newly-formed thread in Step 106, and the initial minimum thread radius is determined from e image. The initial minimum thread radius $h_0$ can be obtained in the manner identified in Steps 109-112. The initial minimum thread radius is stored in the memory for use in calculating the surface viscosity.

The sequence of Steps 107-114 is repeated at sequential time intervals as the thread increases in length and eventually pinches off. Thus, liquid is provided to the nozzle in Step 107 in a controlled manner to avoid any perturbations in the growth of the thread that might result in bad data. An image of the thread at the current time interval is obtained in Step 108 and this image is digitized in Step 109. It can be appreciated that the image of the thread can be a digital image or can be subsequently digitized. The edges of the thread along the entire length of the thread, and optionally the edges of the drop, are detected from the digitized image in step 110. In Step 111, the minimum dimension between the edges along the length of the thread are located and this minimum dimension is measured in Step 112. In Step 113, the dimension and current time interval is stored in the memory for subsequent use in generating the $h_{min}$ vs. $\tau$ line. In the conditional Step 114, if the minimum dimension measures in Step 112 is zero, or at least within an error range of zero, no further images are obtained because the thread has pinched off. However, if the measured minimum distance is non-zero, control returns in loop 119 to Step 107 to acquire and analyze a new image of the thread as it continues to grow. It is understood that the flow of liquid to the nozzle can be at a continuous uniform rate, so that Steps 104 and 107 of providing "further liquid" happen continuously throughout the measurement process. The images are acquired during the continuous growth of the thread, with images acquired at predetermined time intervals calibrated to provide a sufficient number of images to be digitized between thread formation and thread pinch-off.

Once pinch-off of the thread has been detected, the method turns to finding a value for the surface viscosity. In Step 115, the stored $h_{min}$ vs. τ is used to determine a linear relationship. In Step 116, the slope of that line is determined, and in Step 117 the surface tension of the liquid is calculated from the value of the slope, using Equations (1) or (2) described above. The result at the end 118 of the measurement method disclosed herein is a value for the surface viscosity of the liquid that can be used in other processes to more accurately control drop formation and/or more accurately determine drop size, spray patterns, and the like, depending upon the particular application.

Figure 9:
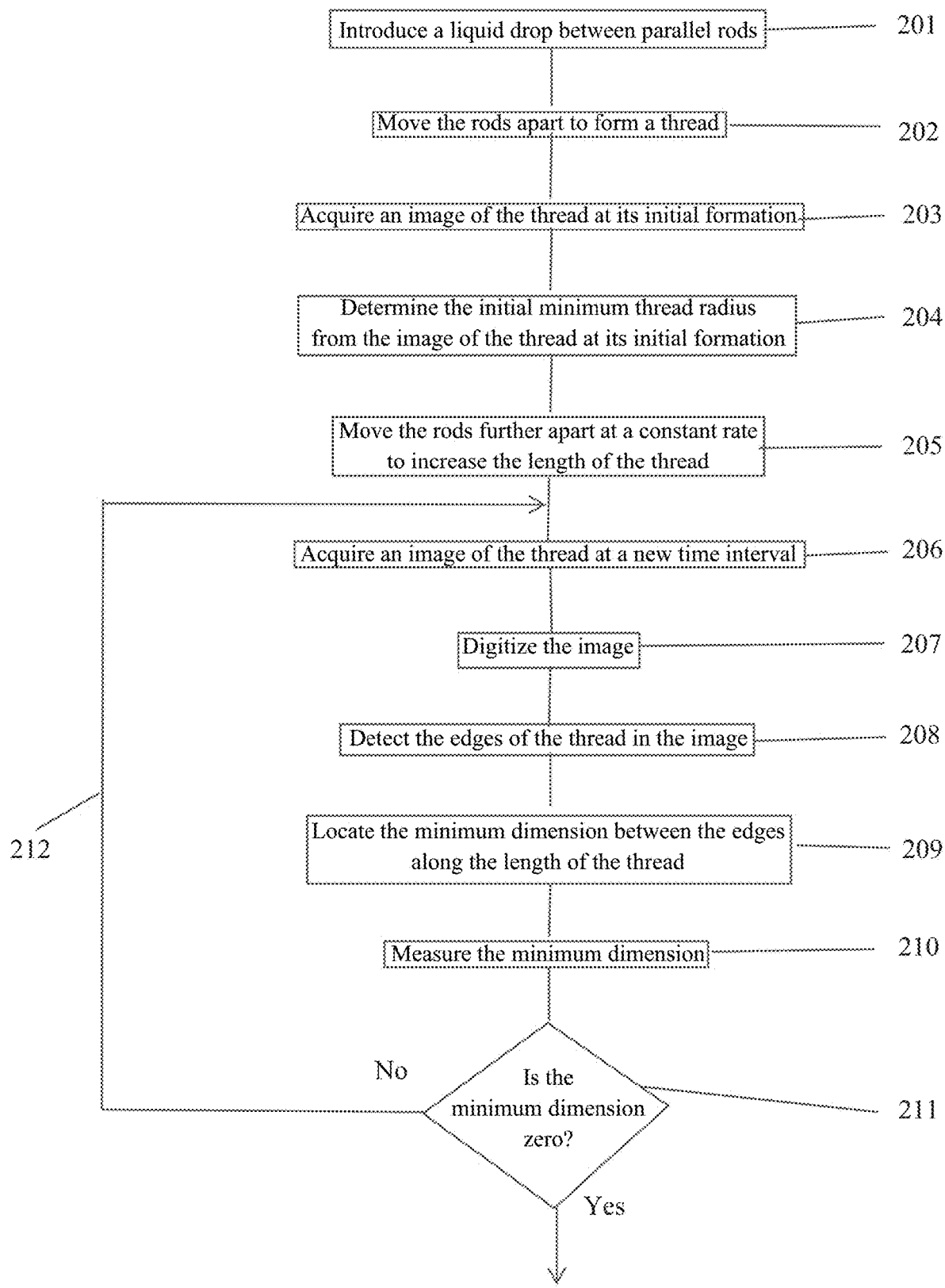
FIG. 9 is a flow chart of steps of another method for determining the surface viscosity of a liquid.

Although the illustrated embodiment relies on drop formation to measure surface viscosity, the methods described herein can be used with other techniques for forming a liquid thread. For instance, one instrument relies on a liquid bridge between parallel rods in which the rods are gradually moved apart to "stretch" the liquid bridge until it pinches off or breaks. With this instrument, the method for measuring surface viscosity follows the steps of FIG. 9. In the first Step 201, a liquid drop is introduced between the ends of two rods, which is equivalent to Step 101 of supplying liquid to the nozzle to form a drop. The ends of the rods are moved apart in Step 202 to form a thread, which is equivalent to Step 104 of the flowchart of FIG. 8. An image of the thread is acquired in Step 203 and initial minimum thread radius is determined in Step 204 from that image. The rods are moved further apart at a constant rate in Step 205, with this movement continuing through the ensuing steps of the method in FIG. 9. Steps 206-211 and loop 212 parallel Steps 107-114 and loop 119. Once the minimum dimension has been found to be zero in the conditional Step 211, the Steps 115-118 are conducted with the minimum dimension data generated in Steps 206-211. In particular, the same equations (1) and (2) can be applied to determine the surface viscosity of the liquid even using the liquid bridge approach. It is contemplated that similar adjustments can be made to the method of FIG. 8 to accommodate other techniques for forming a liquid thread and expanding the thread until pinch-off.

Those skilled in the art will recognize that numerous modifications can be made to the specific implementations and embodiments described herein. The implementations should not be limited to the particular limitations described, as other implementations may be possible within the scope of this disclosure. For instance, in the illustrated embodiment, a camera and image processor are configured to determine the change in minimum thread radius $h_{min}$ from photographic images of the drop and thread taken over the life of the thread. Other means may be implemented to determine the minimum radius of the thread, such a system for measuring the change in electrical resistance of the thread as the thread radius decreases over time. In a system of this type, a baseline measurement at a fixed, known radius (or diameter) as necessary to calibrate the relationship between electrical resistance and the minimum radius (or diameter) of the thread.

What is claimed is:

1. A method for determining a surface viscosity of a liquid, the method comprising:
    providing, with a drop ejection system, a drop of a liquid;
    forming, with the drop ejection system, a thread from the drop that increases in length from a start time until the thread pinches off at an end time;
    at the start time, determining an initial radius $h_0$ of the thread;
    at discrete time intervals between the start time and the end time, (i) determining a minimum radius $h_{min}$ of the thread and (ii) storing, in a memory, the minimum radius $h_{min}$ and time values of the discrete time intervals;
    after the end time, using the stored minimum radius and time values of the discrete time intervals, determining a linear relationship between the minimum radius $h_{min}$ and time;
    determining a slope X of a line in the linear relationship;
    calculating, from the slope X, the surface viscosity $\mu_s$ for the liquid according to one of the following equations:

$$x = \frac{0.0709}{1 + 5B_{s0/3h_0}}, \quad (1)$$

where $B_{s0}=\mu_s/\mu R$ in which R is a dimension of a feature on which the drop is provided and μ is a bulk viscosity of the liquid, or $$x = \frac{0.0304}{Oh(1 + 5B_{s0/3h_0})}, \quad (2)$$

in which $Oh=\mu/\sqrt{\rho R \sigma}$, where ρ is a density of the liquid, and σ is a surface tension of the liquid without surfactants; and
    determining and setting an operational parameter for drop ejection in the drop ejection system based on the surface viscosity $\mu_s$.

2. The method of claim 1, wherein the liquid includes a surfactant.

3. The method of claim 1, wherein equation (1) is selected when a Reynolds number for the liquid is small, and equation (2) is selected when the Reynolds number for the liquid is large.

4. The method of claim 3, wherein equation (1) is selected when a Reynolds number for the liquid is 1 or less and equation (2) is selected when the Reynolds number for the liquid is greater than 1.

5. The method of claim 1, the determining the minimum radius of the thread further comprising:
    obtaining a photographic image of the thread;
    determining a digitized image by digitizing the photographic image;
    detecting edges of the thread in the digitized image;
    measuring a pixel width of the thread between the edges along the length of the thread; and
    identifying a minimum pixel width as the minimum radius of the thread for the digitized image.

6. The method of claim 1, further comprising:
    obtaining a photographic image of the drop;
    determining, from the photographic image, the dimension R.

7. The method of claim 1, the providing the drop further comprising:
supplying the liquid to a nozzle; and
creating a drop from the nozzle, wherein the dimension R is a radius of the nozzle.

8. The method of claim 1, wherein the providing the drop further comprising:
introducing the liquid between ends of two rods to form a drop at the ends of the two rods, wherein the dimension R is a radius of the two rods.

9. The method of claim 1, the determining the initial radius $h_0$ of the thread and the determining the minimum radius $h_{min}$ of the thread further comprising:
obtaining a photographic image of the thread; and
determining the initial radius and minimum radius from the photographic image.

10. A method for determining a surface viscosity of a liquid, the method comprising:
providing, with a drop ejection system, a drop of a liquid, the drop being provided by introducing the liquid between ends of two rods to form the drop at the ends of the two rods;
forming, with the drop ejection system, a thread from the drop that increases in length from a start time until the thread pinches off at an end time;
determining, at the start time, an initial radius $h_0$ of the thread;
at discrete time intervals between the start time and the end time, (i) determining a minimum radius $h_{min}$ of the thread and (ii) storing, in a memory, the minimum radius $h_{min}$ and the discrete time intervals;
after the end time, determining a linear relationship between the minimum radius $h_{min}$ and time, using the stored minimum radius and time values of the discrete time intervals;
determining the surface viscosity $\mu_s$ for the liquid based on the linear relationship between the minimum radius $h_{min}$ and time; and
determining and setting an operational parameter for drop ejection in the drop ejection system based on the surface viscosity $\mu_s$.

11. A method for operating a drop ejection system configured to expel a liquid therefrom, the method comprising:
operating the drop ejection system to provide a drop of the liquid;
operating the drop ejection system to form a thread from the drop that increases in length from a start time until the thread pinches off at an end time;
determining, at the start time, an initial radius $h_0$ of the thread;
at discrete time intervals between the start time and the end time, (i) determining a minimum radius $h_{min}$ of the thread and (ii) storing, in a memory, the minimum radius $h_{min}$ and time values of the discrete time intervals;
after the end time, determining a linear relationship between the minimum radius $h_{min}$ and time, using the stored minimum radius and time values of the discrete time intervals;
determining the surface viscosity $\mu_s$ for the liquid based on the linear relationship between the minimum radius $h_{min}$ and time; and
determining and setting an operational parameter for drop ejection in the drop ejection system based on the surface viscosity $\mu_s$.

12. The method of claim 11, wherein the liquid includes a surfactant.

13. The method according to claim 11, the determining the surface viscosity $\mu_s$ further comprising:
determining a slope X of a line in the linear relationship;
calculating, from the slope X, the surface viscosity $\mu_s$ for the liquid according to one of the following equations:

$$X = \frac{0.0709}{1 + 5B_{s0}/3h_0}, \text{ where } B_{s0} = \mu_s/\mu R$$

where $B_{s0} = \mu_s/\mu R$ in which R is a dimension of a feature on which the drop is provided and $\mu$ is a bulk viscosity of the liquid, or $$X = \frac{0.0304}{Oh(1 + 5B_{s0}/3h_0)}, \text{ in which } Oh = \mu/\sqrt{\rho R \sigma},$$

in which $Oh = \mu/\sqrt{\rho R \sigma}$, where $\rho$ is a density of the liquid, and $\sigma$ is a surface tension of the liquid without surfactants.

14. The method of claim 13, wherein equation (1) is selected when a Reynolds number for the liquid is small, and equation (2) is selected when the Reynolds number for the liquid is large.

15. The method of claim 14, wherein equation (1) is selected when a Reynolds number for the liquid is 1 or less and equation (2) is selected when the Reynolds number for the liquid is greater than 1.

16. The method of claim 11, the determining the minimum radius of the thread further comprising:
obtaining a photographic image of the thread;
determining a digitized image by digitizing the photographic image;
detecting edges of the thread in the digitized image;
measuring a pixel width of the thread between the edges along the length of the thread; and
identifying a minimum pixel width as the minimum radius of the thread for the digitized image.

17. The method of claim 11, further comprising:
obtaining a photographic image of the drop;
determining, from the photographic image, a dimension R,
wherein the surface viscosity $\mu_s$ is determined in part based on the dimension R.

18. The method of claim 11, the operating the system to provide the drop further comprising:
supplying the liquid to a nozzle; and
creating a drop from the nozzle, wherein a dimension R is a radius of the nozzle,
wherein the surface viscosity $\mu_s$ is determined in part based on the dimension R.

19. The method of claim 11, the operating the system to provide the drop further comprising:
introducing the liquid between ends of two rods to form a drop at the ends of the two rods, wherein a dimension R is a radius of the two rods, and
wherein the surface viscosity $\mu_s$ is determined in part based on the dimension R.

20. The method of claim 11, the determining the initial radius $h_0$ of the thread and the determining the minimum radius $h_{min}$ of the thread further comprising:
obtaining a photographic image of the thread; and
determining the initial radius and minimum radius from the photographic image.

* * * * *